March 28, 1961 W. E. SCHULZ 2,976,757
PROCESS FOR FILLING TUBES
Filed Jan. 12, 1959

INVENTOR.
WILLIAM E. SCHULZ
BY

United States Patent Office 2,976,757
Patented Mar. 28, 1961

2,976,757
PROCESS FOR FILLING TUBES
William E. Schulz, Wenonah, N.J., assignor to E. I. du Pont de Nemours and Company, Wilmington, Del., a corporation of Delaware Filed Jan. 12, 1959, Ser. No. 786,285

2 Claims. (Cl. 86—20)

The present invention relates to a process for filling tubes with solids. More particularly, the present invention relates to a process for filling tubes of very small diameter with finely divided granular solids.

Tubes of very small diameter, for example, tubes having an inner diameter of less than 0.1 inch, are produced industrially from a variety of materials and are widely used in many different applications. For example, glass capillary tubes are used extensively in the fields of chemical analysis and electrometry. However, the widespread use of tubes of very small diameter has been limited to applications wherein gases or liquids are passed into or through the tubes. Up to the present time, the use of very-small-diameter tubes containing solid materials has been greatly limited owing to the lack of a satisfactory method for filling such tubes with solids. With the availability of a satisfactory method, tubes of very small diameter containing granular solids will find many uses in industry. For example, the detonation of a granular explosive packed in plastic tubing of very small diameter is highly effective in metal cracking operations. The wide-scale use of such an assembly necessarily is dependent on an economical method of filling the tubes with the granular material.

Accordingly, it is an object of the present invention to provide a process for filling tubes of very small diameter with finely divided granular solids. It is a further object of the present invention to provide a process for filling plastic tubes of very small diameter with a finely divided granular explosive. It is a still further object of the present invention to provide such a process for filling tubes which can be carried out easily and rapidly and which does not require the use of expensive machinery. Other objects will become apparent as the invention is further described.

I have found that the foregoing objects may be achieved by causing a bundle of tubes to be surrounded at one end by a solidifiable liquid material which, on solidification, holds the tubes in a fixed position, cross-sectioning the resulting assembly consisting of tubes and matrix so as to expose open ends of the tubes, and vibrator-packing a finely divided granular solid into the open ends.

In accordance with the process of the invention, a plurality of tubes, e.g., nylon tubes, of very small diameter, e.g., of inner diameter less than 0.1 inch, are gathered into a bundle, and the bundle of tubes is caused to be surrounded by a composition which is liquid at a temperature below the melting temperature of the tubes and which can be solidified and maintained in the solid state at room temperature. The composition is allowed to solidify, whereupon a solid matrix is formed which serves to maintain the tubes in a fixed position. The solidified composition is then cut in a plane which is essentially normal to the axis of the tubes and which passes through all of the tubes so as to expose open ends of the tubes. Thereupon, a receptacle open at least at one end and containing a mass of a finely divided granular solid is affixed to the tube embedment with an open end of the receptacle surrounding the open ends of the tubes, and the assembly thus produced, after being positioned so that the tubes lie in a vertical position with the open ends uppermost, is vibrated to cause the granular solid to flow into the tubes.

In the attached drawing—

Figure 1:
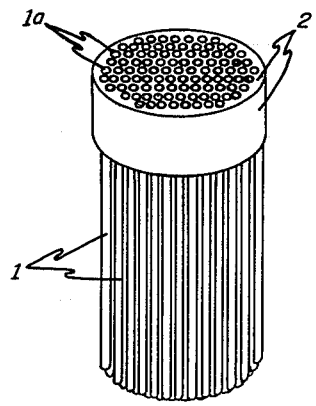
Figure 1 is a perspective view of one particular form of the tube embedment after cutting. However, it is understood that the embedment need not be circular in horizontal cross-section, but may be formed in any convenient shape.

Referring now to the drawings, in Figure 1 the tubes, indicated by the numeral 1, are shown embedded in close proximity to each other in a solid matrix 2, which surrounds each tube so as to hold it in a fixed position. The designation 1a is used to indicate open ends of the embedded tubes 1, in position to be filled.

Figure 2:
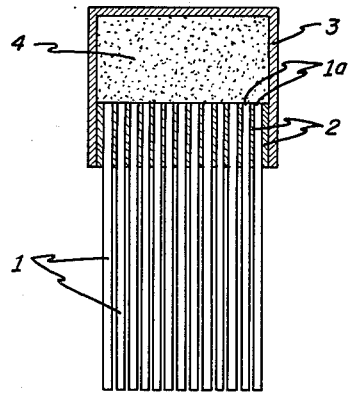
Figure 2 is a vertical cross-section through an assembly comprising the tube embedment and an affixed receptacle containing a finely divided granular solid.

In Figure 2, 1 again represents the tubes embedded in a solid matrix 2 over which is affixed a receptacle 3 open at one end and containing a finely divided granular solid 4, said receptacle being placed over the tube embedment with the open end of the receptacle surrounding the open ends 1a of the tubes so that, on vibration of the assembly thus produced, the finely divided granular solid will flow into the tubes.

The following examples serve to illustrate specific embodiments of the method of carrying out the process of the present invention. However, they will be understood to be illustrative only and not to limit the invention in any way.

*Example 1*

Approximately 50 sections of nylon tubing 16 inches in length and having an inner diameter of 0.034 inch and an outer diameter of 0.064 inch were heat-sealed at one end and gathered into a bundle. The bundle of tubes was immersed at the sealed ends in 93 parts by weight of a polysulfide liquid polymer, having a molecular weight of about 1000 and prepared by the reaction of a sodium polysulfide with a mixture of 98% di(chloroethyl) formal and 2% trichloropropane, to which 7 parts by weight of lead dioxide was added. The polymer was cured overnight at 140° F. to give a strong and rigid matrix, about one inch long, embedding each tube end. The solidified composition was then cut in a plane normal to the axis of the tubes and passing through all of the tubes so as to expose open ends of the tubes. The opposite ends of the tubes were heat-sealed, whereupon the tube embedment was fitted tightly in the open end of a bottle containing lead azide. The entire assembly was fixed in a vertical position with the lead azide uppermost, and was vibrated, thereby causing the lead azide to flow into the embedded tubes. The tubes were filled rapidly, and the filling was complete, as determined by visual inspection. To determine whether the position of the tubes in the assembly had an effect on the load weight, 16 of the tubes were withdrawn singly and numbered, and the charges in each were removed and weighed. The tubes were then replaced in the embedment at random, and the loading and weighing were repeated several times. The high correlation obtained between load weights for an individual tube indicated that tube position was not a critical factor in the filling operation.

*Example 2*

A bundle of tubes as described in Example 1 was immersed at the sealed ends in 100 parts by weight of molten plasticized cellulose acetate butyrate. Upon cooling, the plastic hardened to give a strong matrix, about one inch long, embedding each tube end. After cutting as described in Example 1 and sealing of the opposite ends of the tubes, the tube embedment was fitted tightly in the open end of a bottle containing lead azide. The embedded tubes, when the assembly was positioned and vibrated as described in Example 1, were filled rapidly and completely with lead azide. The open ends of the filled tubes were sealed by application of an adhesive composition, and the tubes were removed from the assembly by heating the embedment and withdrawing the tubes by hand.

*Example 3*

A bundle of tubes as described in Example 1 was immersed at the sealed ends in a molten mixture of 70 parts by weight of polyethylene resin softening at 201° F., and 30 parts by weight of paraffin wax melting at 130° F. Upon cooling, the mixture hardened to give a strong and rigid matrix, about one inch long, embedding each tube end. After cutting as described in Example 1 and sealing of the opposite ends of the tubes, the tubes embedment was fitted tightly into the open end of a bottle containing lead azide. The embedded tubes, when the assembly was positioned and vibrated as described in Example 1, were filled rapidly and completely with lead azide. The open ends of the filled tubes were sealed by application of an adhesive composition, and the tubes were easily withdrawn singly from the assembly by hand.

*Example 4*

A bundle of tubes as described in Example 1 was immersed at the sealed ends in 100 parts by weight of molten Wood's alloy. Upon cooling, the metal solidified to give a matrix, about one-half inch long, embedding each tube end. After cutting as described in Example 1 and sealing of the opposite ends of the tubes, the tube embedment was fitted snugly in the open end of a bottle containing lead azide. The assembly was positioned and vibrated as described in Example 1 to fill the tubes rapidly and completely with lead azide. The open ends of the filled tubes were sealed by application of an adhesive composition, and the tubes were released from the assembly by melting the Wood's alloy by a blast of hot air.

*Example 5*

A bundle of tubes as described in Example 1 was immersed at the sealed ends in 100 parts by weight of molten sulfur at 120° C. Upon cooling, the sulfur solidified to give a rigid matrix, about ¾ inch long, embedding each tube end. After cutting as described in Example 1 and sealing of the opposite ends of the tubes, the tube embedment was fitted snugly into the open end of a bottle containing lead azide. The assembly was positioned and vibrated as described in Example 1 to fill the tubes rapidly and completely with lead azide. The open ends of the filled tubes were sealed by application of an adhesive composition, and the tubes were released by pulling them singly from the potted assembly.

*Example 6*

One hundred sixty-four sections of nylon tubing 16 inches in length and having an inner diameter of 0.034 inch and an outer diameter of 0.064 inch were heat-sealed at one end and gathered into a bundle. The bundle of tubes was immersed in a mixture of 75 parts by weight of an isocyanate-terminated liquid urethane polymer containing 4–4.3% isocyanate groups by weight and 25 parts by weight of castor oil at 212° F. in a container having a 1⅜ inch diameter. The mixture was cured for 4 hours at 212° F. to give a strong matrix, about one inch long, embedding each tube end. After cutting as described in Example 1 and sealing of the opposite ends of the tubes, the tube embedment was fitted tightly in the open end of a bottle containing lead azide. The assembly was positioned and vibrated as described in Example 1 to fill the tubes rapidly and completely with lead azide. The open ends of the filled tubes were sealed by application of an adhesive composition, and the tubes were easily removed from the assembly by withdrawing them singly by hand.

All of the thermoplastic materials used as embedding compositions were reusable.

As is shown in the above examples, many types of compositions are suitable for use as the embedding compositions of the process of the present invention. Such compositions as thermosetting resins (e.g., polysulfides), thermoplastic resins (e.g., plasticized cellulose acetate butyrate), Wood's alloy, and sulfur have been found to be particularly suitable for use as the embedding compositions. The usefulness of these compositions is based on certain similarities in their physical properties and behavior under the conditions encountered in the present process. These properties may be referred to generally as the liquid state/solid state transition behavior of the compositions and the properties of the compositions in each of these states. These properties will now be discussed more fully.

In general, the embedding composition is a liquid at temperatures below the melting temperature of the tubes to be embedded, said liquid being capable of being solidified, e.g., by cooling, or by curing at a temperature below the melting temperature of said tubes, and of being maintained in the solid state at room temperature. While the viscosity of the liquid is not a critical property, it is obvious that the viscosity will have an effect on the time required for the liquid to flow around the closely packed tubes. Therefore, for reasons of economy and convenience, the liquid preferably is one which is not so viscous at the operating temperature as to prevent easy flow around the tubes. I have found that liquids having viscosities not exceeding 400 poises at 25° C. are suitable.

The matrix formed by the solidification of the liquid having the above-described properties is characterized by a certain degree of rigidity in order to hold the embedded tubes firmly. While some flexibility is not detrimental, fairly rigid assemblies can be handled more easily without disturbance of the tubes. Therefore, the minimum necessary degree of rigidity is that which will serve to hold the tubes firmly during the subsequent operations of cutting and vibrator packing.

Related to the rigidity property of the matrix is the length of matrix, i.e., the amount of embedding composition, needed. For a composition which solidifies to a highly rigid matrix, a minimum amount of composition may be used, i.e., an amount which will provide a matrix of enough length to be cut and placed in a vibrator assembly easily. On the other hand, for a composition which solidifies to a matrix of low degree of rigidity, more composition will be needed to provide a matrix of enough length to be handled easily without disturbing the tubes. The rigidity property is also related to the cross-sectional area of the matrix. That is, a matrix of high degree of rigidity will be able to support a greater number of tubes than will a matrix of low degree of rigidity. Furthermore, a minimum practical length of a highly rigid matrix will be able to support as many tubes as desired, whereas the length of a matrix of low degree of rigidity will have to be increased in order to support more tubes.

Although a rigid matrix is desirable to hold the tubes firmly in place, the matrix should be easily workable so as to permit easy withdrawal of the tubes after the filling operation. This easy workability demands that the matrix have at least one of the following properties: (1) low degree of adhesion toward the tube material, e.g., plastics or metals, (2) thermoplasticity, and (3) solubility. Thus, the tubes will be able to be released from the matrix (1) by simple withdrawal if the matrix composition does not adhere to the tubes too strongly; (2)

by heating if the matrix composition can be softened by heating to a temperature below the melting temperature of the tubes and below a critical temperature tolerated by the tube contents; or (3) by dissolving the matrix composition in a solvent toward which the tube material is inert.

Finally, the matrix should be capable of being cut cleanly in order that the embedded assembly can be cut to expose open ends of the tubes. The assembly preferably is cross-sectioned by a cutting operation rather than by sawing or milling in order to avoid the entrance of small-sized cuttings into the tubes.

The properties described above are to be found in materials of various kinds, as is shown in the examples. Moreover, many compositions other than those exemplified can be used as the embedding compositions of the present process. For example, unsaturated polyester resins, phenolic resins, urethane polymers, and epoxy resins, as well as combinations of polymers, e.g., an epoxy resin and a liquid polysulfide polymer, also can be used to advantage. From all of the compositions having the described properties, the selection of a particular composition will finally depend on economic factors. Obviously, a matrix composition must be chemically inert to the tube material and may not be a solvent for such tube material.

The tubes which may be filled by the process of the present invention may be fabricated from a variety of materials, generally taken from the classes comprising plastics and metals. Obviously, different tube materials may require slight variations in handling methods, e.g., in the cutting operation, but the critical features of the process will be the same regardless of the tube material.

The number of tubes which may be filled at one time by the process of the present invention is a variable depending on the dimensions of the embedment and how closely the tubes are packed together. In general, for reasons of economy, it will be preferable to have the tubes packed in as close an array as possible and embedded in a matrix of as large a horizontal cross-section as is practicable so as to permit the filling of a maximum number of tubes in one operation.

The dimensions of the tubes which may be filled by the present process may vary within wide limits. Tubes of any desired length may be filled by the present process, the only limitation on this dimension being that dictated by the space and equipment available. While all tubes of small diameter can be filled effectively by the present process, the process is especially applicable for the filling of tubes of very small diameter, i.e., less than 0.1 inch inner diameter, which heretofore have not been amenable to filling by any practical method.

Obviously, the solid material which is to be loaded into small-diameter tubes by the present process must be in a finely divided state so as to permit unobstructed flow into said tubes. While the useable grain size of the solid material will depend on the size of the tubes to be filled, for tubes of less than 0.1 inch inner diameter the grains should preferably have a particle size such that essentially all will pass through a 150-mesh standard screen. Obviously, there is no minimum grain size.

The means used to position the finely divided granular solid adjacent to the tube embedment is not a critical feature of the present process. Generally, the granular solid may be placed in any desirable container which is open at least at one end, and the container affixed to the tube embedment with an open end of the container facing the open ends of the tubes in the embedment. For example, a receptacle open at one end and containing the granular solid may be thus positioned over the tube embedment, or, alternatively, a receptacle open at both ends may be positioned over the tube embedment and the granular solid may be fed to the receptacle as needed.

The sealing of the tubes in the present process also is not a critical feature. Obviously, the tubes must be sealed at the lower ends prior to filling, but whether or not sealing is necessary at the ends to be embedded will depend on the manner in which the solidifiable composition is applied. Generally, if the tubes are immersed in the solidifiable composition, it will be necessary to seal the ends prior to immersion to avoid entrance of the composition into the tubes. However, other methods of applying the solidifiable composition, e.g., pouring or spraying, may obviate the need for sealing of the ends to be embedded. After the tubes have been filled, if desired, the open ends may be sealed prior to removal from the embedment and this may be accomplished by any conventional sealing method, for example, by wiping an adhesive liquid or paste over the open ends of the tubes and then cooling the tubes so as to force the liquid or paste into the ends of the tubes by atmospheric pressure. Removing excess adhesive from the face of the assembly will prevent sealing the tubes to the potted assembly.

The invention has been described in detail in the foregoing. It will be apparent to those skilled in the art that many variations are possible without departure from the scope of the invention. I intend, therefore, to be limited only by the following claims.

I claim:

1. A process for filling tubes of very small diameter with a finely divided granular solid which comprises collecting a plurality of tubes into a bundle, surrounding one end of said bundle by a solidifiable composition which is liquid at a temperature below the melting temperature of said tubes, solidifying said composition, cutting said solidified composition in a plane which is essentially normal to the axis of said tubes and passes through said tubes to expose open ends on said tubes, introducing a mass of a finely divided granular solid adjacent to said open ends of said tubes, and vibrating the assembly thus produced to cause said granular solid to flow into said tubes.

2. A process for filling plastic tubes of very small diameter with a finely divided granular explosive which comprises collecting a plurality of plastic tubes into a bundle, surrounding one end of said bundle by a solidifiable composition which is liquid at a temperature below the melting temperature of said tubes, solidifying said composition, cutting said solidified composition in a plane which is essentially normal to the axis of said tubes and passes through said tubes to expose open ends on said tubes, introducing a mass of a finely divided granular explosive adjacent to said open ends of said tubes, and vibrating the assembly thus produced to cause said granular explosive to flow into said tubes.

References Cited in the file of this patent

UNITED STATES PATENTS

| | | |
|---|---|---|
| 1,410,741 | Erdle | Mar. 28, 1922 |
| 1,626,118 | Olin et al. | Apr. 26, 1927 |
| 2,121,597 | Karl | June 21, 1938 |
| 2,762,302 | MacLeod | Sept. 11, 1956 |
| 2,775,987 | Bohlman et al. | Jan. 1, 1957 |
| 2,882,820 | Young | Apr. 21, 1959 |